United States Patent
Tata et al.

(10) Patent No.: US 11,830,269 B2
(45) Date of Patent: *Nov. 28, 2023

(54) SYSTEM FOR INFORMATION EXTRACTION FROM FORM-LIKE DOCUMENTS

(71) Applicant: Google LLC, Mountain View, CA (US)

(72) Inventors: Sandeep Tata, San Francisco, CA (US); Bodhisattwa Prasad Majumder, La Jolla, CA (US); Qi Zhao, Santa Clara, CA (US); James Bradley Wendt, San Francisco, CA (US); Marc Najork, Palo Alto, CA (US); Navneet Potti, Sunnyvale, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/867,300

(22) Filed: Jul. 18, 2022

(65) Prior Publication Data

US 2022/0375245 A1    Nov. 24, 2022

Related U.S. Application Data

(63) Continuation of application No. 16/890,287, filed on Jun. 2, 2020, now Pat. No. 11,393,233.

(51) Int. Cl.
*G06T 7/70* (2017.01)
*G06V 30/413* (2022.01)
(Continued)

(52) U.S. Cl.
CPC ............ *G06V 30/413* (2022.01); *G06F 18/21* (2023.01); *G06F 18/22* (2023.01); *G06N 5/04* (2013.01);
(Continued)

(58) Field of Classification Search
CPC .... G06V 30/412; G06V 10/23; G06V 30/274; G06V 30/413; G06V 30/416;
(Continued)

(56) References Cited

U.S. PATENT DOCUMENTS

| 5,933,823 | A | * | 8/1999 | Cullen | ................ | G06F 16/5838 |
| 2017/0068866 | A1 | * | 3/2017 | Kostyukov | .......... | G06V 30/413 |

(Continued)

OTHER PUBLICATIONS

Cai et al., "Block-based Web Search", 27th Annual International ACM SIGIR Conference, Jul. 25-29, Sheffield, South Yorksire, UK, 8 pages.

(Continued)

*Primary Examiner* — Ali Bayat
(74) *Attorney, Agent, or Firm* — Dority & Manning, P.A.

(57) ABSTRACT

The present disclosure is directed to extracting text from form-like documents. In particular, a computing system can obtain an image of a document that contains a plurality of portions of text. The computing system can extract one or more candidate text portions for each field type included in a target schema. The computing system can generate a respective input feature vector for each candidate for the field type. The computing system can generate a respective candidate embedding for the candidate text portion. The computing system can determine a respective score for each candidate text portion for the field type based at least in part on the respective candidate embedding for the candidate text portion. The computing system can assign one or more of the candidate text portions to the field type based on the respective scores.

20 Claims, 7 Drawing Sheets

(51) Int. Cl.
*G06N 20/00* (2019.01)
*G06N 5/04* (2023.01)
*G06V 30/412* (2022.01)
*G06V 30/262* (2022.01)
*G06V 30/416* (2022.01)
*G06F 18/21* (2023.01)
*G06F 18/22* (2023.01)

(52) U.S. Cl.
CPC .............. *G06N 20/00* (2019.01); *G06T 7/70* (2017.01); *G06V 30/274* (2022.01); *G06V 30/412* (2022.01); *G06V 30/416* (2022.01); *G06T 2207/30176* (2013.01)

(58) Field of Classification Search
CPC .... G06V 30/10; G06K 9/6215; G06K 9/6217; G06N 5/04; G06N 20/00; G06T 7/70; G06T 2207/30176
USPC ........................................................ 382/159
See application file for complete search history.

(56) References Cited

U.S. PATENT DOCUMENTS

| | | | |
|---|---|---|---|
| 2017/0109610 A1 | 4/2017 | Macciola et al. | |
| 2019/0332658 A1 | 10/2019 | Heckel et al. | |
| 2020/0126533 A1* | 4/2020 | Doyle ................... | G10L 15/063 |
| 2020/0142999 A1 | 5/2020 | Pedersen | |
| 2020/0159820 A1* | 5/2020 | Rodriguez ............ | G06V 30/412 |
| 2020/0394763 A1* | 12/2020 | Ma ........................ | G06V 30/414 |
| 2021/0012102 A1* | 1/2021 | Cristescu ............. | G06V 30/412 |
| 2021/0012199 A1 | 1/2021 | Zhang et al. | |

OTHER PUBLICATIONS

Cai et al., "Extracting Content Structure for Web Pages based on Visual Representation", 5th Asia-Pacific Web Conference, APWeb 2003, Apr. 23-25, 2003, Xian China, 12 pages.
Chiticariu et al., "Rule-based Information Extraction is Dead! Long Live Rule-based Information Extraction Systems!", 2013 Conference on Empirical Methods in Natural Language Processing, Oct. 18-21, 2013, Seattle, WA, pp. 827-832.
Chowdhury, "Template Mining for Information Extraction from Digital Documents", Library Trends, vol. 48, No. 1, Summer 1999, pp. 182-208.
Dalvi et al., "Automatic Wrappers for Large Scale Web Extraction", 37th International Conference on Very Large Data Bases, Aug. 29-Sep. 3, 2011, Seattle WA, pp. 219-230.
Denk et al., "BERTgrid: Contextualized Embedding for 2D Document Representation and Understanding", arXiv:1909.04948v2, Oct. 14, 2019, 4 pages.
Doermann et al., "The Processing of Form Documents", 2nd International Conference Document Analysis and Recognition, Oct. 20-22, 1993, Tsukuba City, Japan, pp. 497-501.
Duchi et al., "Adaptive Subgradient Methods for Online Learning and Stochastic Optimization", Journal of Machine Learning Research, vol. 12, 2011, pp. 2121-2159.
Hobbs et al., "Information Extraction", Handbook of Natural Language Processing, Chapman & Hall/CRC Press, 2010, pp. 511-532.
Katti et al., "Chargrid: Towards Understanding 2D Documents", 2018 Conference on Empirical Methods in Natural Language Processing, Oct. 31-Nov. 4, 2018, Brussels, Belgium, pp. 4459-4469.
Lample et al., "Neural Architectures for Named Entity Recognition", The 2016 Conference of the North American Chapter of the Association for Computational Linguistics: Human Language Technologies, Jun. 12-17, 2016, San Diego, CA, pp. 260-270.
Liu et al., "Graph Convolution for Multimodal Information Extraction from Visually Rich Documents", 2019 Annual Conference of the North American Chapter of the Association for Computational Linguistics, Jun. 2-7, 2019, Minneapolis, MN, pp. 32-39.
Palm et al., "CloudScan—A configuration-free invoice analysis system using recurrent neural networks", arXiv: 1708.07403v1, Aug. 24, 2017, 8 pages.
Peng et al., "Cross-Sentence N-ary Relation Extraction with Graph LSTMs", Transactions of the Association for Computational Linguistics, vol. 5, Apr. 2017, pp. 101-115.
Sarawagi, "Information Extraction" Foundations and Trends in Databases, vol. 1, No. 3, 2008, pp. 261-377.
Schuster et al., "Intellix—End-User Trained Information Extraction for Document Archiving", 12th International Conference on Document Analysis and Recognition (IDCAR), Aug. 25-28, 2013, Washington, DC, 5 pages.
Vandermaaten et al., "Visualizing Data using t-SNE", Journal of Machine Learning, vol. 9, No. 86, 2008, pp. 2579-2605.
Vaswani et al., "Attention is all you Need", 31st Conference on Neural Information Processing Systems (NIPS 2017), Dec. 4-9, 2017, Long Beach, CA, 11 pages.
Yu et al., "Improving Psuedo-Relevance Feedback in Web Information Retrieval Using Web Page Segmentation", The Twelfth International World Wide Web Conference, May 20-24, 2003, Budapest, Hungary, 8 pages.
Zhao et al., "CUTIE: Learning to Understand Documents with Convolutional Universal Text Information Extractor", arXIV:1903.12363v2, Apr. 4, 2019, 9 pages.
Zhu et al., "2D Conditional Random Fields for Web Information Extraction", 22nd International Conference on Machine Learning, Aug. 7-11, 2005, Bonn, Germany, 8 pages.
Zhu et al., "Simultaneous Record Detection and Attribute Labeling in Web Data Extraction", Twelfth ACM SIGKDD International Conference on Knowledge Discovery and Data Mining, Aug. 20-23, 2006, Philadelphia, PA, pp. 494-503.

* cited by examiner

SYSTEM FOR INFORMATION EXTRACTION FROM FORM-LIKE DOCUMENTS

PRIORITY CLAIM

The present application is a continuation of U.S. application Ser. No. 16/890,287 having a filing date of Jun. 2, 2020. Applicant claims priority to and the benefit of each of such applications and incorporate all such applications herein by reference in its entirety.

FIELD

The present disclosure relates generally to machine-learned models. More particularly, the present disclosure relates to extracting information from structured documents such as forms using a machine-learned model.

BACKGROUND

Form-like or "templatic" documents are common in many business workflows such as: invoices, purchase orders, bills, tax forms, financial reports, etc. Invoices, for example, are a document type that many enterprises encounter and process. Invoices generated by a single vendor will often be identical in form, and only differ at the field locations (e.g. dates, amounts, order numbers, etc.).

Thus, templatic documents often include a fixed portion, e.g., a form consisting of delineating lines, tables, titles, field names, etc., which all documents created from that template share, and a variable portion, e.g. field values, consisting of the text that is specific to each document.

Large enterprises that purchase from thousands of companies are likely to see many thousands of different invoice templates. However, the relevant information that needs to flow into a business process is independent of the template and only particular to the domain. Each invoice often contains common information such as the invoice number, the invoice date, an invoice amount, the item quantities and prices, payment details, a pay-by date, and so on. The same information needs to be extracted from each invoice, irrespective of different presentations by the underlying templates. Processing these types of documents is a common task in many business workflows, but current techniques still employ either manual effort or brittle and error-prone heuristics for extraction.

Extracting this information can be particularly challenging for the following reasons. First, in contrast to many scenarios contemplated in the field of information extraction, form-like documents do not contain much, if any, prose. Approaches that work well on natural text organized in sentences cannot be applied directly to templatic documents such as tax forms and invoices where many layout elements like tables and grid formatting are commonplace. Second, these documents are usually in PDF or scanned image formats, so spatial presentation hints are not explicitly available in a markup. Third, within a domain, such as invoices, documents may belong to thousands, if not millions of different templates. However, in a particular domain, only a small number of manually labeled examples may be available. Thus, it is difficult to train a model to generalize well to unseen templates.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method. The method can include obtaining, by a computing system comprising one or more computing devices, an image of a document that contains a plurality of portions of text. The method can include extracting, by the computing system from the image of the document, one or more candidate text portions for each of one or more field types included in a target schema. The method can include generating, by the computing system, a respective input feature vector for each candidate text portion for the field type, wherein the respective input feature vector for each candidate text portion comprises data describing a respective position of one or more neighbor text portions that are proximate to the candidate text portion. The method can include processing, by the computing system using a machine-learned scoring model, the respective input feature vector for each candidate text portion to generate a respective candidate embedding for the candidate text portion. The method can include determining, by the computing system, a respective score for each candidate text portion for the field type based at least in part on the respective candidate embedding for the candidate text portion. The method can include assigning, by the computing system, one or more of the candidate text portions to the field type based at least in part on the respective scores generated for the candidate text portions.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which refers to the appended figures, in which.

DETAILED DESCRIPTION

Figure 1:
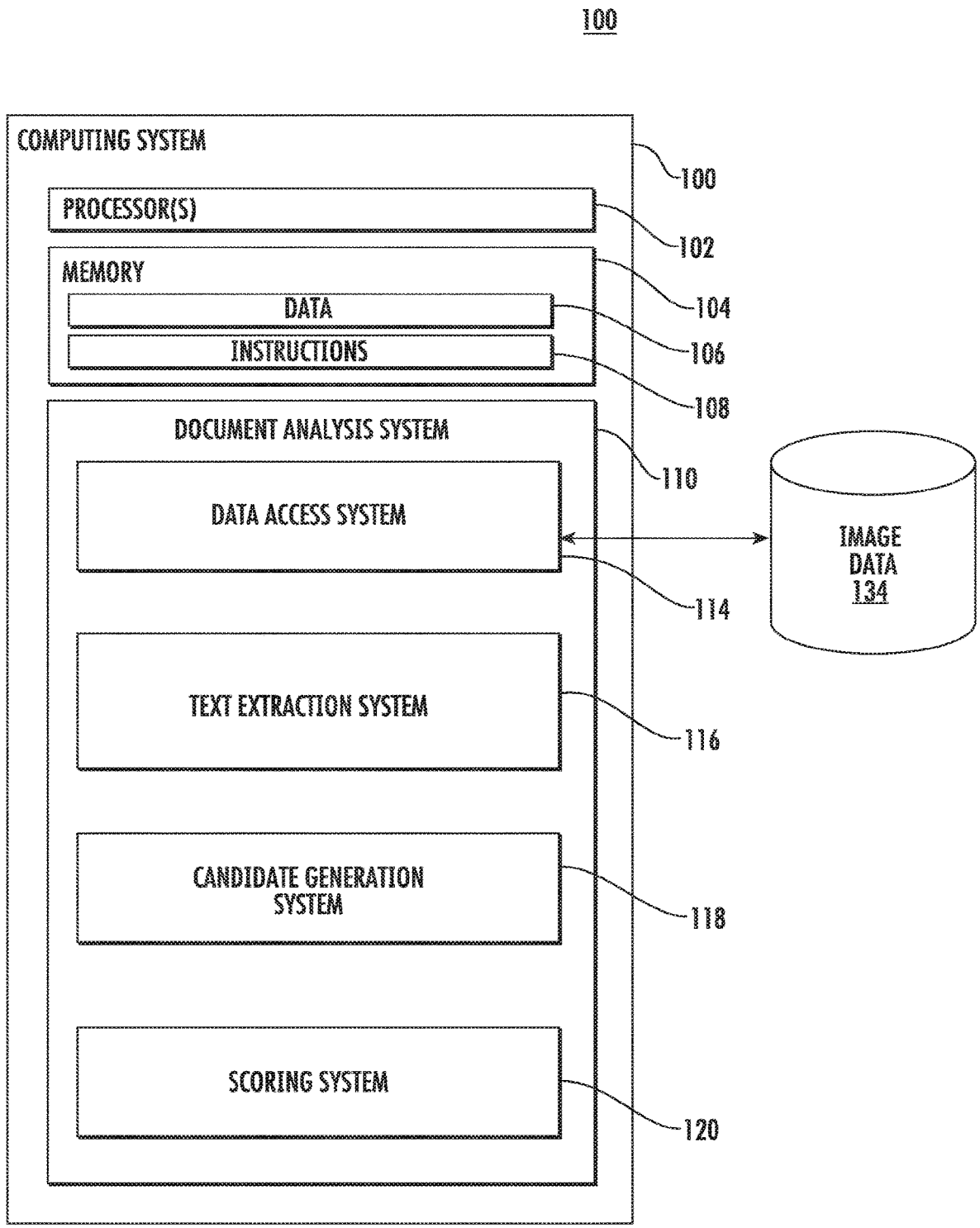
FIG. 1 depicts an example document analysis system according to example aspects of the present disclosure.

Generally, the present disclosure is directed to a system for extracting information from form-like documents. In particular, one aspect of the present disclosure provides an end-to-end trainable system that solves the described extraction task using one or more machine learning models. The proposed systems are robust to both native digital documents and scanned images relying on optical character recognition (OCR) rather than specialized code for dealing with different document formats. Specifically, in some implementations, the proposed systems and methods can include or leverage a machine learning model (e.g., neural network) that learns a dense representation for an extraction candidate based on the tokens in its neighborhood and their relative location. This representation has a desirable property: positive and negative examples for each field form separable clusters. Using the above candidate representation, the systems and methods of the present disclosure can generate a score for each candidate relative to a field type contained in a target schema and candidates can be assigned to the field types based on the scores. The extracted information can be used for a number of tasks including automated actions responsive to the extracted document content (e.g., automated document indexing, invoice/bill payment, due date calendaring, etc.).

More particularly, in some examples, work-flows for many business processes can include many documents that are form-like, in that they have similar types of information that are contained in the documents or expected when such a document is received. For example, such documents can include invoices, purchase orders, bills, tax forms, financial reports, and so on. The ability to process such documents automatically and reliably can significantly reduce the expense and time expended.

To extract information from form-like documents, a document analysis system can identify a plurality of document types. Each document type can be associated with a commonly received form-like document. Thus, a first document type can be an invoice, a second type can be a purchase order, and so on. Each document type can have an associated target schema. The target schema can include one or more expected fields, each field associated with a piece of information expected in documents of that type. For example, the target schema associated with an invoice can include a due date field, an amount field, and so on.

The document analysis system can receive an image of a document. For example, the image can be a native digital image of the document, a scanned image of the document, and/or an image of the document captured using a device having a camera (e.g., a smartphone). The document type associated with the document can be predetermined or determined by analysis of the document. The document analysis system can then analyze the image to extract a plurality of text portions (or text segments) from the document. Extracting the data from a particular text portion can include determining both the content of the text portion and the location of the text portion within the document.

Once a plurality of text portions have been extracted from the document, the document analysis system can determine, based on the document type associated with the document, the target schema associated with the document. Based on the target schema, the document analysis system can determine one or more field types that are expected to be found in the document. The document analysis system can, for each field type, determine one or more candidate text portions from the plurality of text portions extracted from the document. In some examples, the text portions can be analyzed to determine what type of content the text portion includes. For example, some text portions can be associated with dates, other text portions can be associated with currency amounts, etc.

Once a list of candidate text portions has been determined for a particular field type, the document analysis system can generate a score for each candidate text portion. In some examples, the document analysis system can use a machine-learned model to generate the score for each candidate text portion. The document analysis system can select a candidate text portion to be assigned to the field in the target schema based, at least in part, on the generated score.

The machine-learned model can take, as input, information about the field type for which the candidate text portion is a candidate. The machine-learned model can further take, as input, information describing the position of the candidate text portion, the position of one or more neighbor text portions, and the content of the one or more neighbor text portions. The text analysis system can determine which text portions are neighbor text portions based on one or more predetermined rules. For example, the document analysis system can determine that a text portion is a neighbor text portion if the text portion is to the left of and above the candidate text portion within a predetermined distance. Other rules can be used to identify one or more neighbor text portions for a given candidate text portion. In some examples, the specific rule used to identify neighbors can be determined based, at least in part, on the field type for which the text portion is a candidate.

Using a machine-learned model, the document analysis system can generate a score for each candidate text portion. To do so, the machine-learned model can generate one or more embeddings (e.g., intermediate representations) of the input data and generate scores by comparing the generated embeddings. For example, the machine-learned model associated with the document analysis system can take information about the field type as input. Using this information, the machine-learned model can generate an embedding for the field type. In some examples, the embedding can represent the characteristics that are expected of a text portion, including, but not limited to, information describing the expected position of the text portion on a document, information describing the expected neighbor positions and content, and so on.

The machine-learned model associated with the document analysis system can generate a candidate position embedding, the candidate position embedding being generated based on the position of the candidate text portion, but not, in some implementations, on the content of the candidate text portion. Thus, the candidate positioning embedding can represent data describing the position of the candidate text position.

The machine-learned model associated with the document analysis system can generate a neighborhood candidate position embedding. To do so, the machine-learned model can first generate an intermediate representation for each neighbor text portion independent of the other neighbor text portions in the plurality of neighbor encodings. The initial neighbor encoding for each respective neighbor text portion can be based on the position and content of the respective neighbor text portion, without respect to the position and content of any other neighbor text portion. However, once the initial representations are generated, the machine-learned model can use one or more self-attention layers to access the respective neighbor encodings for each neighbor text portion and generate an attention weight vector for one or more neighbor text portions. The self-attention layers can use the attention weight vectors to update each neighbor encoding for the plurality of neighbor encodings. In one example, the attention weight vector can down weight the respective word embeddings for each neighbor text portion that has another neighbor text portion positioned between it and the candidate text portion. Thus, the neighbor embedding for each neighbor text portion can be altered based on the neighbor embeddings of other neighbor text portions that have been identified.

Once the embeddings for each neighbor text portion have been generated, a neighborhood encoding can be generated to represent the data from all identified neighbors of the candidate text portion. The neighborhood embedding can be combined, by the machine-learned model, with the candidate position embedding. Combining these two intermediate representations can generate a candidate encoding. The candidate encoding can be compared to the field encoding to generate an overall score for the particular candidate text portion.

Once all candidate text portions have a score value associated with them, the document analysis system can select the candidate text portion to be assigned to the field based on the generated scores. The selected candidate text portion can be assigned to the field type for the particular target schema. This process can be repeated for each field value until all relevant field values have an assigned candidate text portion.

Once the field values have an associated candidate text portion, the document analysis system can transmit data indicating the selected values for each field data to a central server for use and/or further analysis. For example, the data can be entered into a system that uses the data to perform relevant business operations such as paying invoices, monitoring tax obligations, and so on.

Three general principles (or observations) can inform how the document analysis system can be organized to best extract data from form-like documents. First, each field can correspond to a well-understood type. For example, the only likely candidate text portions for the invoice date field in an invoice are the dates that occur in that document. Thus, a currency amount like $25.00 would clearly be incorrect. Furthermore, types such as dates, currency amounts, integers, ID numbers, and addresses correspond to notions that are generally applicable across domains. Thus, detectors for such types can have fairly high precision which can dramatically simplify the information extraction task at little to no cost.

The second principle is that each field instance can be associated with a key phrase that bears an apparent visual relationship with it. For example, if a document includes only two data instances, the one with the word "Date" next to it is more likely to be the correct text portion for the invoice date. While key phrases (e.g., words strongly associated with particular fields) occur near the field instances, proximity is not the only criterion defining them. For example, the word "Date" may not be the nearest text portion to the true invoice date instance in a particular example (e.g., other text portions may be closer such as a page number). Fortunately, these spatial relationships can generally exhibit only a small number of variations across document templates, and these can tend to generalize across fields and domains. The visual cues in this task can be an important distinguishing factor that sets it apart from standard information extraction tasks on text corpora.

The third principle is that the key phrases for a field can be largely drawn from a small vocabulary of field-specific variants. For example, the invoice date field can be associated with only a few key phrases (e.g., date, dated, or invoice date) in most of the documents to be analyzed. The fact that there are only a small number of field-specific key phrases means that it is possible for a model to learn to identify these phrases without having a sophisticated understanding of the infinite variety of natural language. This is yet another crucial difference between the current extraction task and other more general types of text extraction.

To more specifically discuss the system and how it works, additional description below describes the process as a pipeline with several stages and discusses each stage in more specific detail. The first stage of the pipeline is the document ingestion stage. During the document ingestion stage, the document analysis system can ingest both native digital documents as well as scanned documents. In some examples, the document analysis system can render all the documents into a scanned format (e.g., an image) such that the process for extracting information from them is uniform.

Once the document or documents have been received and prepared, the document analysis system can use a text recognition technique to extract all the text in the document. In some examples, the extracted text can be arranged in the form of a hierarchy with individual characters at the leaf level, and words, paragraphs, and blocks respectively in higher levels. The nodes in each level of the hierarchy can be associated with bounding boxes represented in the two-dimensional Cartesian plane of the document page. The words in a paragraph can be arranged in reading order and the paragraphs and blocks themselves can be arranged similarly.

In some examples, the document analysis system can access the scanned text data and divide the scanned text into one or more discrete text portions. A text portion may be defined as a group of text characters that are associated based on the layout of the text characters within the document. For example, this may include single words, short phrases that are associated with each other, numbers grouped into dates or currency values, and so on.

Each discrete text portion can be associated with content (e.g., the text itself) and with a particular location. The location can be represented as an absolute location within the document and a relative location based on its position as compared to one or more other text portions within the document.

Once the document has been obtained, scanned, and the text portions extracted, the document analysis system can begin the candidate generation stage of the pipeline. The candidate generation stage includes the process for determining which text portions are candidates to be matched with particular fields. To do so, the document analysis system can determine which target schema is associated with the document currently being analyzed. In some examples, the target schema can be predetermined such that the document analysis system receives information regarding the document type before receiving the document or as the document is received. In other examples, the document analysis system can determine the document type (and thereby the target schema) based on an analysis of the contents of the document itself. Thus, if the document includes the title "Invoice", the document analysis system can determine that the document type is "invoice" and can access the target schema associated with invoices.

For each text portion, the document analysis system can determine a portion type associated with the text portion. A portion type can include the type of content included in the text portion. Some examples of portion types can include dates, integers, currency amounts, addresses, labels, etc. In some examples, the document analysis system can semantically label each text portion based on a variety of techniques, such as regular expression matching to neural sequence labeling using models trained on web data. As noted below, assigning a portion type to a particular text portion can be part of the candidate generator process.

Once the document analysis system determines the target schema (e.g., based on the document type) and has categorized or labeled each text portion, the system can generate a list of candidates for each field in the target schema. For example, if the document type is an invoice, the fields included in the target schema can include an invoice date, an invoice amount, an invoice ID, and a due date.

In some examples, each field or field type can be associated with one or more candidate generators. For example, the candidate generators can detect spans of the text extracted from the documents that are instances of the corresponding type. For example, a candidate generator for a date field can identify each text portion that includes text that can be identified as a date. In addition, a given candidate text portion can be associated with more than one field. For example, every text portion determined to be a date can become in an invoice becomes a candidate for every date field in the target schema. Thus, for invoices, fields associated with dates can include the invoice date and the due date. If a particular text portion is associated with dates, it can be a candidate for more than one field.

Once a set of candidate text portions are determined for a given field, the document analysis system can begin the score generation stage of the pipeline. During the score generation stage, the document analysis system can generate a score for each candidate text portion. The score can represent the degree to which the text portion matches the field. As a result, the better a given text portion matches the field, the higher the generated score will be. The score can be represented as a value from 0 to 1. Once the scores have been generated, the document analysis system can assign a candidate text portion to the field based, at least in part, on the score associated with the field. In some examples, additional business rules can be used to select a text portion from the plurality of candidate text portions. For example, a business rule may require that the due date for an invoice cannot (chronologically) precede its invoice date, or that the line item prices must sum up to the total.

More specifically, a score can be generated by a scorer system, either included as part of the machine-learned model or accessed by the document analysis system. The scorer system can take as input a candidate text portion and a target schema field it is associated with and produce a prediction score between 0 and 1. The score can be expected to be proportional to the likelihood that this candidate text portion is the correct value for that field in that document. In some examples, the scorer system can be trained and evaluated as a binary classifier.

The scorer system can determine one or more features associated with a particular candidate text portion. In examples, the features captured by the scorer system can include the text portions that appear nearby, along with their positions. In some examples, a simple rule for identifying relevant nearby text portions can be used. For example, the scorer system can define a neighborhood zone around the candidate text portion extending from the position of the candidate text portion all the way to the left edge of the page and extending about 10% of the page height above the position of the candidate text portion.

In some examples, any text portion whose bounding boxes (e.g., the portion of the document associated with the text portion) overlap by more than half with the neighborhood zone of a candidate text portion can be considered to be a neighbor of the candidate text portion. In some examples, the scorer system can encode the neighbor text portions using a vocabulary. The vocabulary can include a special representational segment or token for out-of-vocabulary words and a special representational segment or token for all numbers. In addition, the list of neighbor text segments can be padded until the list has a predetermined fixed size to ensure a consistent size for the list of neighbors. For example, the list can be padded to ensure that there are 20 neighbor text portions, with the padded candidate text portions being represented as a pad token.

The scorer system can represent the position of a candidate text portion and each of its neighbor text portions using the two-dimensional Cartesian coordinates of the centroids of their respective bounding boxes. These coordinates can be normalized by dividing the corresponding page dimensions so that the features are independent of the pixel resolution of the input documents. The scorer system can calculate the relative position of a neighbor text portion as the difference between its normalized two-dimensional coordinates and those of the candidate text portion. The relative positions for the padding neighbors can be set to (1.0, 1.0). In some examples, the absolute position for the candidate text portion can be calculated and used as input to the scorer system.

The scorer system can then embed information associated with a variety of inputs separately such that a more useful intermediate representation of each input can be generated. For example, each text portion included in the neighboring text portions can be embedded using a word embedding table. Additionally, the position of each neighbor text portion can be embedded through a nonlinear positional embedding consisting of two ReLU-activated layers with dropout. This nonlinear embedding can allow the machine-learned model to learn to resolve fine-grained differences in position. For example, the non-linear embedding can enable the document analysis system to distinguish between words on the same line and those on the line above.

The scorer system can employ an embedding table for the field that the candidate text portion belongs to. In a model with embedding dimension d, the sizes of each neighbor text portion's word and position embeddings are set to be d. Because each candidate text portion is padded to have the same number of neighbor text portions (e.g., N neighbors), the neighbor embeddings can be denoted as $\{h_1, h_2, h_N\}$ with each $h_i \in \mathbb{R}^{2d}$. The size of the candidate position embedding and the field embedding can also be set to be d.

The scorer system can generate initial neighbor embeddings for each neighbor text portion independently of each other. Each of the initial neighbor embeddings $h_i \in \mathbb{R}^{2d}$ can be transformed into query, key, and value embedding spaces through three different linear projection matrices $W_q$, $W_k$, and $W_v \in \mathbb{R}^{2d \times 2d}$. The neighbors can be packed together in a matrix H to obtain:

$$q_i = h_i W_q \quad K = H W_k \quad V = H W_v$$

For each neighbor text portion i, the associated query embedding $q_i$ and the key embeddings K can be used to obtain the attention weight vector as follows:

$$\alpha_i = \text{Softmax}\left(\frac{q_i K^T}{\sqrt{2d}}\right)$$

One or more self-attending neighbor layers can encode $\tilde{h}_t$ $\in \mathbb{R}^{2d}$ for neighbor i as a linear combination of the value embeddings V for all the neighbors with attention weight vector $\alpha_t$ as $\tilde{h}_t = \alpha_t V$. To improve stability, the scorer system can use a normalization constant of $\sqrt{2d}$ The scorer system can project the self-attended neighbor encodings to a larger 4×2d dimensional space using a linear projection with ReLU nonlinearity and then projecting the encodings back to a 2d-dimensional space.

Once all the neighbor text portions have been encoded into encodings of size 2d, the scorer system can form a single encoding by combining them all into an encoding of size 2d. Note that because the N neighbor encodings already capture information about the relative positions of the neighbors with respect to the candidate text portions in the embeddings themselves, it is important to ensure that the neighborhood encoding is invariant to the (arbitrary) order in which the neighbor text portions are included in the features. Therefore, the scorer system can average these neighbor encodings rather than, say, concatenating them.

The scorer system can obtain a candidate encoding by concatenating the neighborhood encoding $\in \mathbb{R}^{2d}$ with the candidate position embedding $\in \mathbb{R}^{2d}$ and projecting (through a ReLU-activated linear layer) back down to d dimensions.

Using the candidate encoding and the neighbor embeddings, the scorer system can generate a candidate encoding. The candidate encoding can be expected to contain all relevant information about the candidate, including its position and its neighborhood. The scorer system can be a neural network that is trained as a binary classifier and generates a score for a candidate text portion according to how likely the text portion is to be the true extraction value for some field and document.

Given a field embedding for a particular field and a candidate encoding for the candidate text portion, the scorer system can compute a cosine similarity for the two intermediate representations. The cosine similarity can be rescaled linearly to generate a score between 0 and 1. The scorer system can be trained using binary cross-entropy between this prediction and the target label as the loss function. The document analysis system can select, for each field, a candidate text portion based, at least in part, on the scores associated with the plurality of candidate text portions. The selected candidate text portion can be assigned to the field.

The systems and methods described herein provide a number of technical effects and benefits. More particularly, the systems and methods of the present disclosure provide improved techniques for reliably and automatically extracting useful data from form-like documents. For instance, the document analysis system (and its associated processes) can use a machine-learned model to reliably and efficiently extract information from form-like documents. Reducing the time and computer power needed to extract this information reduces the time needed and the cost incurred to access this information. Additionally, increasing the accuracy of the system for extracting avoids potentially costly errors.

With reference to the figures, example embodiments of the present disclosure will be discussed in further detail.

FIG. 1 depicts an example document analysis system according to example aspects of the present disclosure. As illustrated, FIG. 1 includes a computing system 100 that can be used to analyze and extract data from form-like documents. The computing system 100 can include one or more processor(s) 102, memory 104, and a document analysis system 110.

The one or more processor(s) 102 can be any suitable processing device, such as a microprocessor, microcontroller, integrated circuit, or other suitable processing device. The memory 104 can include any suitable computing system or media, including, but not limited to, non-transitory computer-readable media, RAM, ROM, hard drives, flash drives, or other memory devices. The memory 104 can store information accessible by the one or more processor(s) 102, including instructions 106 that can be executed by the one or more processor(s) 102 and data 108 needed to execute the instructions. The instructions 106 can be any set of instructions that when executed by the one or more processor(s) 102, cause the one or more processor(s) 102 to provide the desired functionality.

In particular, in some devices, memory 104 can store instructions for implementing the document analysis system 110. The computing system 100 can implement the document analysis system 110 to execute aspects of the present disclosure, including extracting text from form-like documents automatically.

It will be appreciated that the term "system" can refer to specialized hardware, computer logic that executes on a more general processor, or some combination thereof. Thus, a system can be implemented in hardware, application specific circuits, firmware and/or software controlling a general-purpose processor. In one embodiment, the system can be implemented as program code files stored on the storage device, loaded into memory, and executed by a processor or can be provided from computer program products, for example computer executable instructions, that are stored in a tangible computer-readable storage medium such as RAM, hard disk or optical or magnetic media.

Memory 104 can also include data 106 that can be retrieved, manipulated, created, or stored by the one or more processor(s) 102. In some example embodiments, such data can be accessed and used as input to the document analysis system 110. In some examples, the memory 104 can include data used to perform one or more processes and instructions that describe how those processes can be performed.

In some examples the document analysis system 110 can include a data access system 114, a text extraction system 116, a candidate generation system 118, and a scoring system 120. Each component included in the document analysis system 110 can be implemented as a distinct machine-learned model or as one component of a machine-learned model. In some examples, the computing system 100 can be connected to a database of image data 134 wherein the image data includes images of a plurality of form-like documents.

The data access system 114 can access an image of a document from the database of image data 134. In some examples, the documents stored in the database of image data 134 can be received from a plurality of different sources. The documents can be initially received already in an image format. For example, documents may be received in portable document format (pdf) or a similar format with the characteristics of an image. Alternatively, the data access system 114 can render all the documents into a scanned format (e.g., an image) such that the process for extracting information from all documents is uniform regardless of the format in which the document was originally received.

In some examples, the data access system 114 can determine a target schema for the document represented in the images. For example, the database of image data 134 can store image files by document type and therefore, the data access system 114 can select images associated with a particular target schema (e.g., processing a batch of similar document types at once) or determine the target schema for a document based on metadata stored in the database of image data 134. The document type (and therefore the associated target schema) associated with the document can be determined by analysis of the document.

The text extraction system 116 can analyze the image to extract a plurality of text portions from the image or document. In some examples, the text extraction system can use optical character recognition techniques to identify characters, words, phrases, etc. in the document and group them into discrete text portions. Extracting text portions can include determining both the text included in each text portion and the location of each text portion within the document. In some examples, the text extraction system 116 can determine a type or semantic label for the content in each text portion. In other examples, the candidate generation system 118 can perform this content type determination step.

The candidate generation system 118 can determine the target schema associated with the current document (i.e., an image of the document). A target schema can include one or more field types, each field type can represent a piece of information commonly included in a document of that type. For example, an invoice may include an invoice date, a due date, an amount owed, etc. The candidate generation system 118 can, for each field type, determine one or more candidate text portions extracted from the document. As noted above, the text portions can be analyzed to determine what type of content is included in the text portion. For example, some text portions can be associated with dates, other text portions can be associated with currency amounts, etc.

Once a list of candidate text portions has been determined for a particular field type, the scoring system 120 can generate a score for each candidate text portion. In some examples, the scoring system 120 can use a machine-learned model to generate the score for each candidate text portion. The scoring system 120 can select a candidate text portion to be assigned to the field in the target schema.

More specifically, the machine-learned model can take, as input, information about the field type for which the candidate text portion is a candidate. The machine-learned model can further take, as input, information describing the position of the candidate text portion, the position of one or more neighbor text portions, and the content of the one or more neighbor text portions. The text extraction system 116 can generate information describing which text portions are neighbor text portions based on one or more predetermined rules. For example, the text extraction system 116 can determine that a text portion is a neighbor text portion if the text portion is to the left of and above the candidate text portion within a predetermined distance. Other rules can be used to identify one or more neighbor text portions for a given candidate text portion. In some examples, the specific rule used to identify neighbors can be determined based, at least in part, on the field type for which the text portion is a candidate.

Using a machine-learned model, the scoring system 120 can generate a score for each candidate text portion. To do so, the machine-learned model can generate one or more embeddings (e.g., intermediate representations) of the input data and generate scores by comparing the generated embeddings. For example, the machine-learned model associated with the scoring system 120 can take information about the field type as input. Using this information, the machine-learned model can generate an embedding for the field type. In some examples, the embedding can represent the characteristics that are expected of a text portion that matches the field, including, but not limited to, information describing the expected position of the text portion on a document, information describing the expected neighbor positions and content, and so on.

The machine-learned model associated with the scoring system 120 can generate a candidate position embedding. In some examples, the candidate position embedding can be generated based on the position of the candidate text portion, but not on the content of the candidate text portion. Thus, the candidate positioning embedding can represent data describing the position of the candidate text position but does not represent the content of the candidate text portion.

The machine-learned model associated with the scoring system 120 can generate a neighborhood candidate position embedding. To do so, the machine-learned model can first generate a representation of each neighbor text portion independent of the other neighbor text portions. Thus, the initial representation of each neighbor text portion can be based on the position and content of the neighbor text portion, without respect to the position and content of any other neighbor text portion. However, once the initial representations are generated, the machine-learned model can use one or more self-attention layers to obtain the respective word embeddings for each neighbor text portion and generate an attention weight vector that down weights the respective word embeddings for each neighbor text portion that has another neighbor text portion positioned between it and the candidate text portion. Thus, the embedding for each neighbor text portion can be altered based on the other neighbor text portions that have been identified.

Once the embeddings for each neighbor text portion have been generated, a neighborhood encoding can be generated to represent the data from all identified neighbors of the candidate text portion. The neighborhood embedding can be combined, by the machine-learned model, with the candidate position embedding. Combining these two intermediate representations can generate a candidate encoding. The candidate encoding can be compared to the field encoding to generate an overall score for the particular candidate text portion.

Once all candidate text portions have a score value associated with them, the scoring system 120 can select the candidate text portion based on the generated scores associated with each candidate text portion (e.g., selecting the candidate text embedding with the highest score). The selected candidate text portion can be assigned to the field type for the particular target schema. This process can be repeated for each field value until all relevant field values in the target schema have an assigned candidate text portion.

Once the field values have an associated candidate text portion, the document analysis system 110 can store data indicating the assigned values for each field data for later use or transmit the data to a second computing system for use and/or further analysis. For example, the data can be transmitted to a second computing system that uses the data to perform relevant business operations such as paying invoices, monitoring tax obligations, and so on. In some examples, the document analysis system 110 can map the one or more of the candidate text portions assigned to one or more of the field types to an action that is presented to a user.

Figure 2:
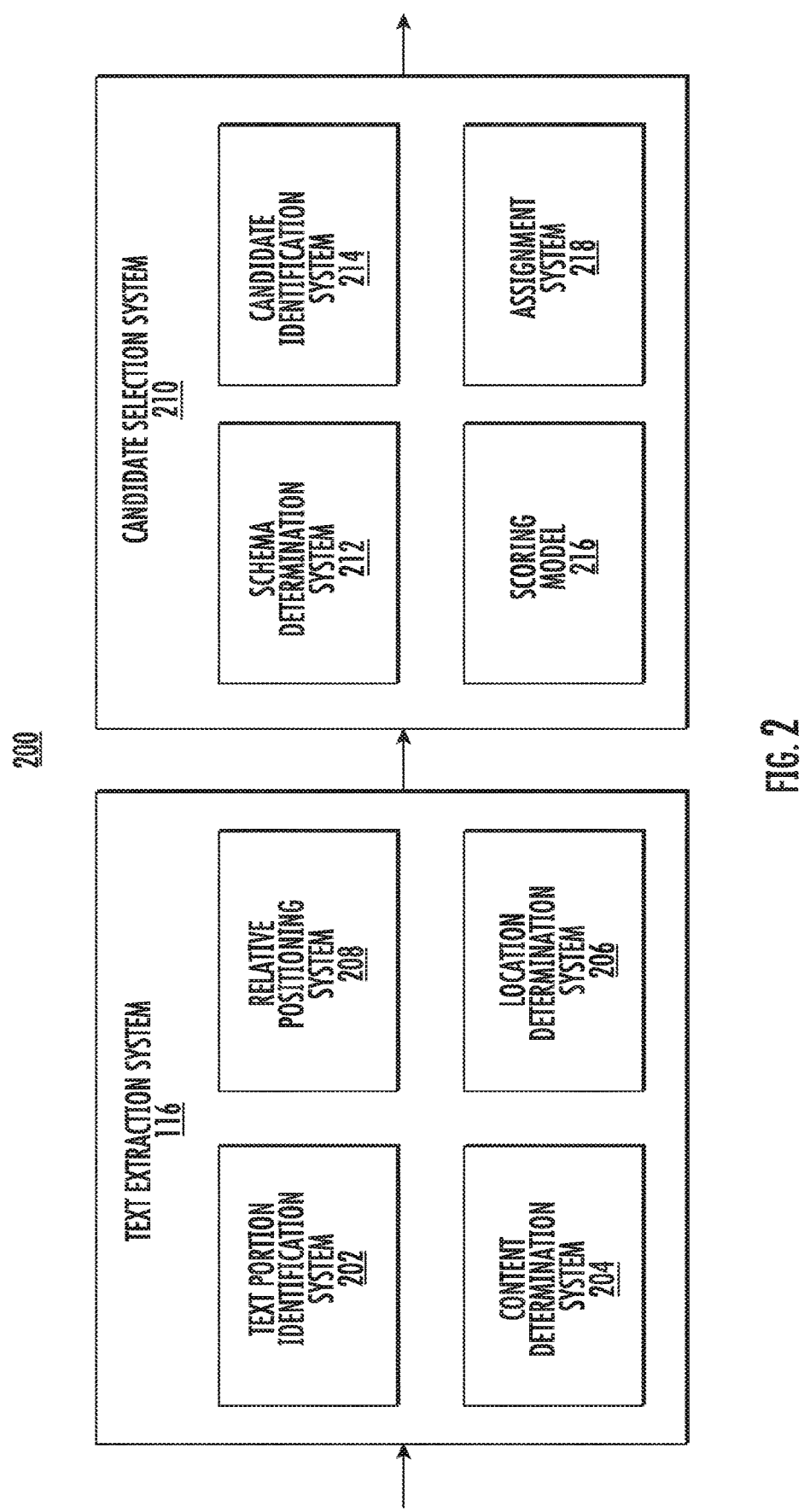
FIG. 2 depicts a block diagram illustrating an example system for extracting text information from a form-like document according to example aspects of the present disclosure.

FIG. 2 depicts a block diagram illustrating an example system 200 for extracting text information from a form-like document according to example aspects of the present disclosure. In this example, the system 200 performs the document analysis process by dividing it across two major components. The first component can be a text extraction system 116. In this representation of the system 200, the text extraction system 116 can access images representing documents, extract relevant information from the images, and prepare the information to be used by the candidate selection system 206.

In this example, the text extraction system 116 can include a text portion identification system 202, a content determination system 204, a location determination system 206, and a relative position system 208. A text portion identification system 202 can extract characters from a document (or an image of a document) and group characters together into one or more text portions. In some examples, the text portion identification system 202 can group characters together based on both the content of the characters and the position of the characters relative to each other. Thus, some characters will form a word and be tightly spaced. In this case, the text extraction system 116 can determine that the characters are part of a word or phrases that should be grouped into a text portion. In some examples, the text portion identification system 202 can arrange extracted text in the form of a hierarchy with individual characters at the leaf level, and words, paragraphs, and blocks respectively in higher levels.

A content determination system 204 can be used to identify a type of content included in each identified text portion. For example, the content determination system 204 can determine whether a text portion is associated with dates, amounts, addresses, labels, and so on. For example, if the content of a particular text portion consists chiefly of numbers, the content determination system 204 can determine whether the numbers are more likely to be indicative of a date or a currency amount. Similarly, if a particular text portion has alphabetic characters in it, the content determination system 204 can determine whether the text portion serves as a label for another text portion. For example, a text portion with the content "date" can be determined to be associated with another text portion as a label.

A location determination system 206 can determine, for each text portion, the position of the text portion within the document. This information can be stored for later analysis. A relative positioning system 208 can determine the position of text portions relative to each other. In this way, the text extraction system 116 can identify one or more neighbors for each text portion. In some examples, the text extraction system 116 (or the document analysis system more generally) can include one or more rules for identifying neighbor text portions.

Once the text has been extracted, a candidate selection system 210 can determine which text portions are to be assigned to each field in a plurality of fields in a target schema associated with the current document. The candidate selection system 206 includes a schema determination system 212, a candidate identification system 214, a scoring model 216, and an assignment system 218.

A schema determination system 212 can determine for a particular document, or image associated with that document, a target schema. The target schema can include one or more fields that represent pieces of information expected to be contained within the target document. For example, a tax form may have one or more pieces of information expected to be included. Target schemas can be determined prior to the extraction of any text from the document. In some examples, the target schema associated with a particular document can be determined prior to accessing the document. For example, the system 200 may be assigned to extract text from a plurality of invoice documents. Thus each document accessed by the text extraction system 116 can be associated with a target schema for invoices.

The candidate identification system 214 can determine, for each field in the target schema, a data type associated with that field. For example, if the field is a date field, the candidate identification system 214 can determine that matching candidate text portions can include data in a date format. The candidate identification system 214 can then identify one or more text portions within the document identified by the text portion identification system 202 that match the data type of the field. Thus if the field is determined to be a date field, any text portion whose content is determined to be a date can be a candidate for that field.

Once one or more text portion candidates have been identified for a particular field, a scoring model 216 can use information about the field, the position of the candidate text portion, and the content and position of any neighboring text portions as input to the scoring model. It should be noted that in at least some cases, the specific content of the candidate text portion is not considered by the scoring model 216 once it has been determined to be of the correct type.

As described in more context below, the scoring model 216 can generate a score representing the likelihood that the current candidate text portion is the correct text portion to be assigned to the particular field. Using the generated scores, an assignment system 218 can assign the most likely text portion to be associated with a particular field. Once all the fields in a particular target schema have text portions assigned to them, the system 200 can save the extracted data for later use or prompt one or more user actions based on the extracted data. For example a user can be prompted to pay an invoice, deal with tax obligations, forward the information to a relevant party, and so on.

Figure 3:
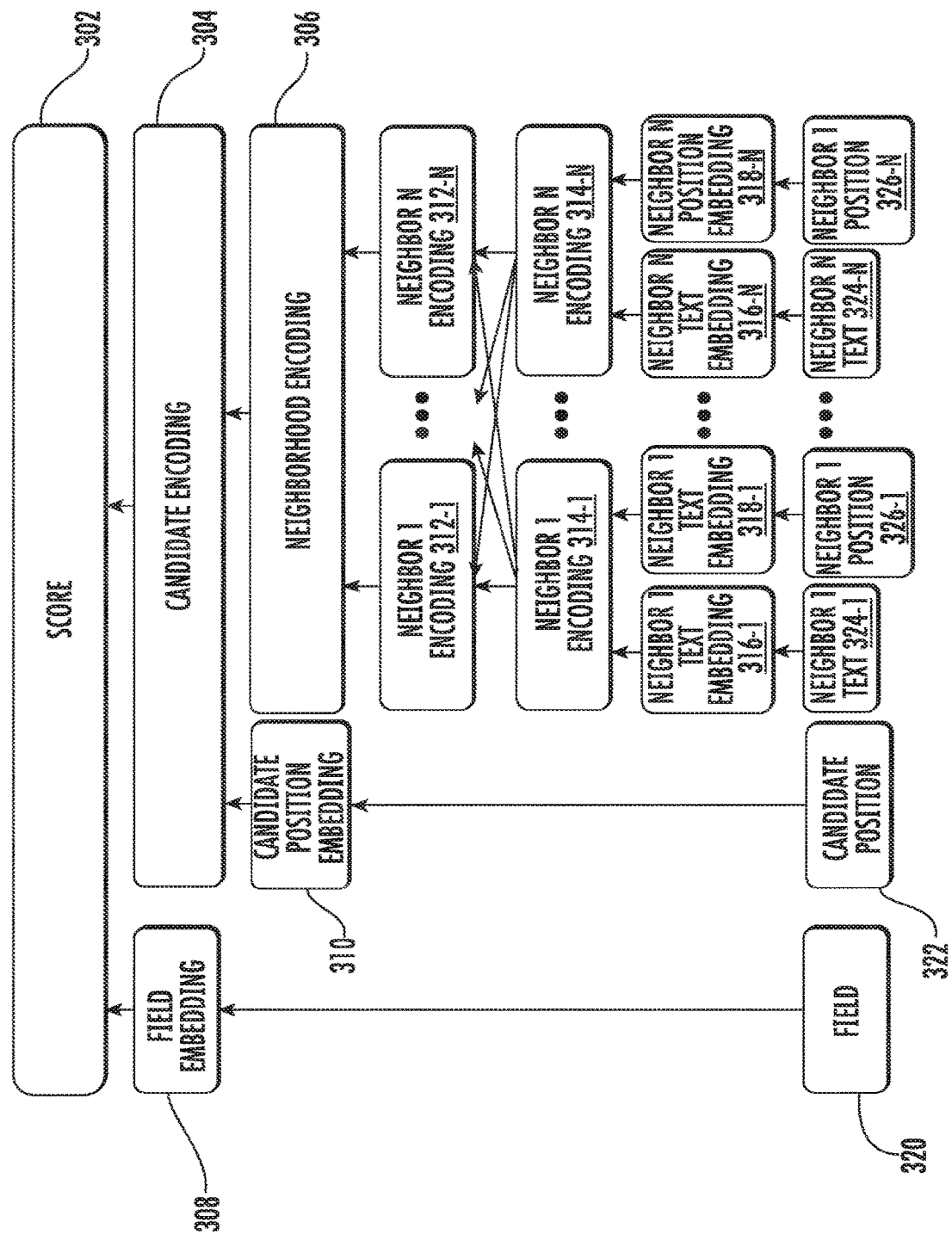
FIG. 3 depicts a block diagram illustrating an example system for generating score values for candidate text portions according to example aspects of the present disclosure.

FIG. 3 depicts a block diagram illustrating an example system for generating score values for candidate text portions according to example aspects of the present disclosure. The example system can be a score model as shown in FIG. 2. The score model 216 can include a series of steps and intermediate representations to generate a score 302.

Once a set of candidate text portions are determined for a given field, the document analysis system (e.g., document analysis system 110 in FIG. 1) can begin the multi-step process for generating a score 302 for each candidate text portion. The document analysis system (e.g., document analysis system 110 in FIG. 1) can employ a score model 216 to generate a score for each candidate text portion. The score can represent the degree to which the text portion matches the field. As a result, the better a given text portion matches the field, the higher the generated score will be. The score can be represented as a value from 0 to 1. Once the scores have been generated, the score model 216 can assign a candidate text portion to the field based, at least in part, on the score associated with the field. In some examples, additional business rules can be used to select a text portion from the plurality of candidate text portions. For example, a business rule may require that the due date for an invoice cannot (chronologically) precede its invoice date, or that the line item prices must sum up to the total.

The score model 216 can be included as a stage in a larger machine-learned model or an independent machine-learned model that is accessed by the document analysis system (e.g., document analysis system 110 in FIG. 1). The score model 216 can take as input a candidate text portion and a target schema field 320 and produce, as output, a prediction score between 0 and 1. The score 302 can be expected to be proportional to the likelihood that this candidate text portion is the correct value for that field in that document. In some examples, the score model 216 can be trained and evaluated as a binary classifier.

The score model 216 can determine one or more features associated with a particular candidate text portion. In examples, the features captured by the score model 216 can include the text portions (324-1 to 324-N) that appear nearby, along with their positions. In some examples, a simple rule for identifying relevant nearby text portions (324-1 to 324-N) can be used. For example, the score model 216 can define a neighborhood zone around the candidate text portion extending from the position of the candidate text portion all the way to the left edge of the page and extending about 10% of the page height above the position of the candidate text portion.

In some examples, any text portion whose bounding boxes (e.g., the portion of the document associated with the text portion) overlap by more than half with the neighborhood zone of a candidate text portion can be considered to be a neighbor of the candidate text portion. In some examples, the score model 216 can encode the neighbor text portions using a vocabulary. The vocabulary can include a special representational segment or token for out-of-vocabulary words and a special representational segment or token for all numbers. In addition, the list of neighbor text portions (324-1 to 324-N) can be padded until the list has a predetermined fixed size to ensure a consistent size for the list of neighbors. For example, the list can be padded to ensure that there are 20 neighbor text portions, with the padded candidate text portions being represented as a pad token.

The score model 216 can represent the position of a candidate text portion 322 and each of its neighbor text portions (326-1 to 326-N) using the two-dimensional Cartesian coordinates of the centroids of their respective bounding boxes. These coordinates can be normalized by dividing the corresponding page dimensions so that the features are independent of the pixel resolution of the input documents. The score model 216 can calculate the relative position of a neighbor text portion (e.g., 326) as the difference between its normalized two-dimensional coordinates and those of the candidate text portion. The relative positions for the padding neighbors can be set to (1.0, 1.0). In some examples, the absolute position for the candidate text portion can be calculated and used as input to the score model 216.

The score model 216 can then embed information associated with a variety of inputs separately such that a more useful intermediate representation of each input can be generated. For example, each text portion included in the neighboring text portions (324-1 to 324-N) can be embedded using a word embedding table to generate a text portion embedding (316-1 to 316-N). Additionally, the position of each neighbor text portion (326-1 to 326-N) can be embedded through a nonlinear positional embedding consisting of two ReLU-activated layers with dropout to generate a neighbor position embedding (318-1 to 318-N). This nonlinear embedding can allow the machine-learned model to learn to resolve fine-grained differences in position. For example, the non-linear embedding can enable the score model 216 to distinguish between words on the same line and those on the line above.

The score model 216 can employ an embedding table for the field 320 that the candidate text portion is being scored in relation to. In a model with embedding dimension d, the sizes of each neighbor text portion's word (324) and position embeddings (326) are set to be d. Because each candidate text portion is padded to have the same number of neighbor text portions (e.g., N neighbors), the neighbor embeddings can be denoted as $\{h_1, h_2, h_N\}$ with each $h_i \in \mathbb{R}^{2d}$. The size of the candidate position embedding and the field embedding can also be set to be d.

The score model 216 can generate initial neighbor embeddings (314-1 to 314-N) for each neighbor text portion independently of each other. Each of the initial neighbor embeddings $h_i \in \mathbb{R}^{2d}$ can be transformed into query, key, and value embedding spaces through three different linear projection matrices $W_q$, $W_k$, and $W_v \in \mathbb{R}^{2d \times 2d}$. The neighbors can be packed together in a matrix H to obtain:

$$q_i = h_i W_q \quad K = H W_k \quad V = H W_v$$

For each neighbor text portion i, the associated query embedding $q_i$ and the key embeddings K can be used to obtain the attention weight vector as follows:

$$\alpha_i = \text{Softmax}\left(\frac{q_i K^T}{\sqrt{2d}}\right)$$

One or more self-attending neighbor layers can encode $\tilde{h}_i \in \mathbb{R}^{2d}$ for neighbor i as a linear combination of the value embeddings V for all the neighbors with attention weight vector $\alpha_i$ as $\tilde{h}_i = \alpha_i V$. To improve stability, the score model 216 can use a normalization constant of $\sqrt{2d}$. The score model 216 can project the self-attended neighbor encodings (312-1 to 312-N) to a larger 4×2d dimensional space using a linear projection with ReLU nonlinearity and then projecting the encodings back to 2d.

Once all the neighbor text portions have been encoded into encodings of size 2d (312-1 to 312-N), the score model 216 can form a single encoding by combining them all into a neighborhood encoding 306 of size 2d. Note that because the N neighbor encodings (312-1 to 312-N) already capture information about the relative positions of the neighbors with respect to the candidate text portions in the embeddings themselves, it is important to ensure that the neighborhood encoding 306 is invariant to the (arbitrary) order in which the neighbor text portions are included in the features. Therefore, the score model 216 can average these neighbor encodings rather than, say, concatenating them.

The score model 216 can obtain a candidate encoding 304 by concatenating the neighborhood encoding $306 \in \mathbb{R}^{2d}$ with the candidate position embedding $310 \in \mathbb{R}^{2d}$ and projecting (through a ReLU-activated linear layer) back down to d dimensions.

Using the candidate encoding 310 and the neighbor embeddings, the score model 216 can generate a candidate encoding 304. The candidate encoding 304 can be expected to contain all relevant information about the candidate, including its position and its neighborhood. The score model 216 can be a neural network that is trained as a binary classifier and generates a score 302 for a candidate text portion according to how likely the text portion is to be the true extraction value for a given field and document.

Given a field embedding 308 for a particular field 320 and a candidate encoding 304 for the candidate text portion, the score system 216 can compute a cosine similarity for the two intermediate representations. The cosine similarity can be rescaled linearly to generate a score 302 between 0 and 1. The score model 216 can be trained using binary cross-entropy between this prediction and the target label as the loss function. Using this score 302, the document analysis system can select, for each field, a candidate text portion to be assigned to the field.

Figure 4:
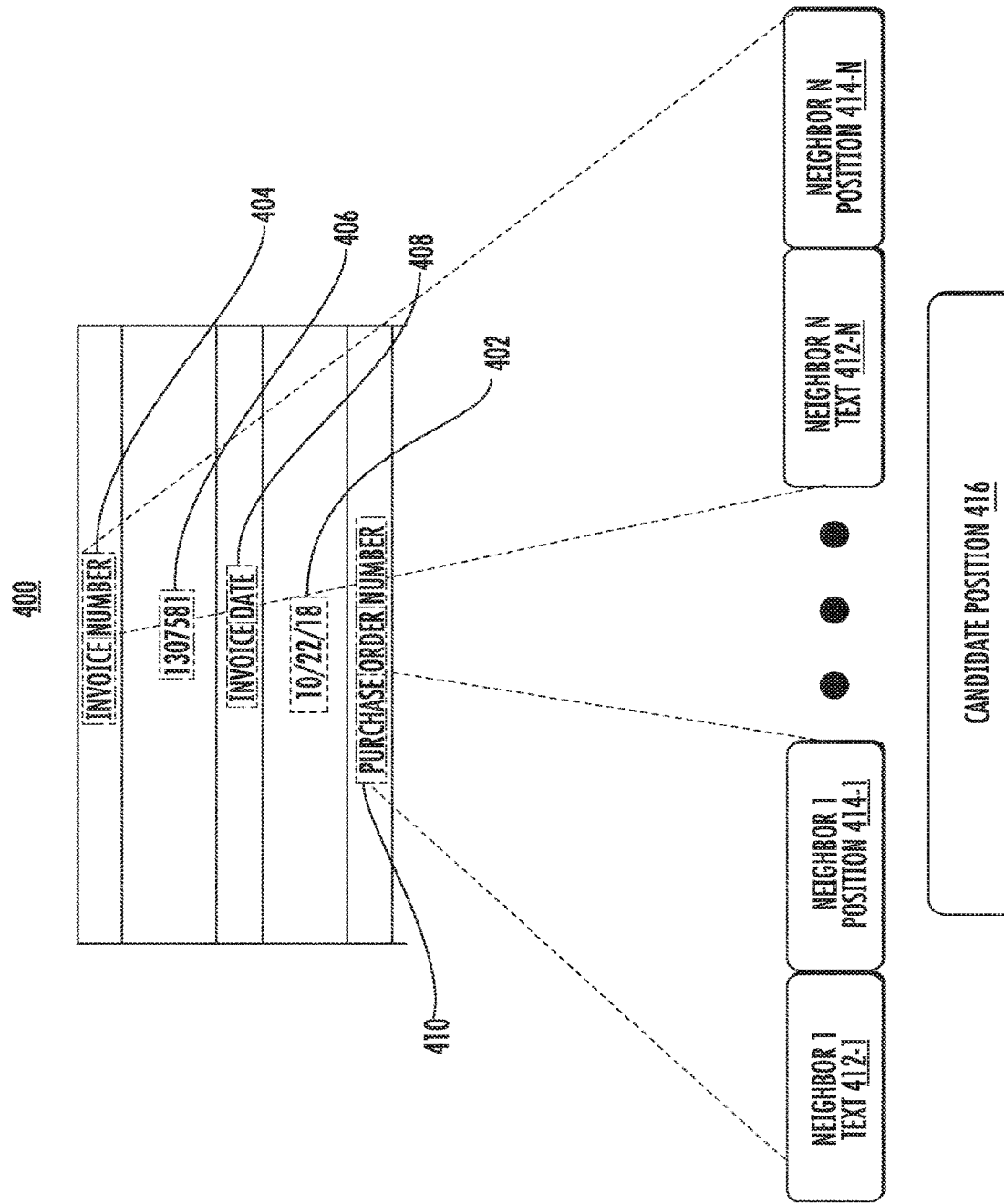
FIG. 4 depicts an example document to be analyzed by the document analysis system according to example aspects of the present disclosure.

FIG. 4 depicts an example document 400 to be analyzed by the document analysis system according to example aspects of the present disclosure. This example document 400 includes a plurality of text portions, including a candidate text portion 402 and a plurality of neighbor text portions (404, 406, 408, and 410). The scoring system (scoring system 120 in FIG. 1) can identify the position of the candidate text portion 416.

The scoring system (scoring system 120 in FIG. 1) can identify the text of one or more neighbor text portions (412-1 to 412-N) and the positions of the one or more neighbor text portions (414-1 to 414-N). Using this data, the scoring system (scoring system 120 in FIG. 1) can generate a score describing the degree to which the text portion matches a particular field in a target schema. For example, the candidate text portion 402 can be evaluated to determine whether it matches a date field in the target schema.

Figure 5:
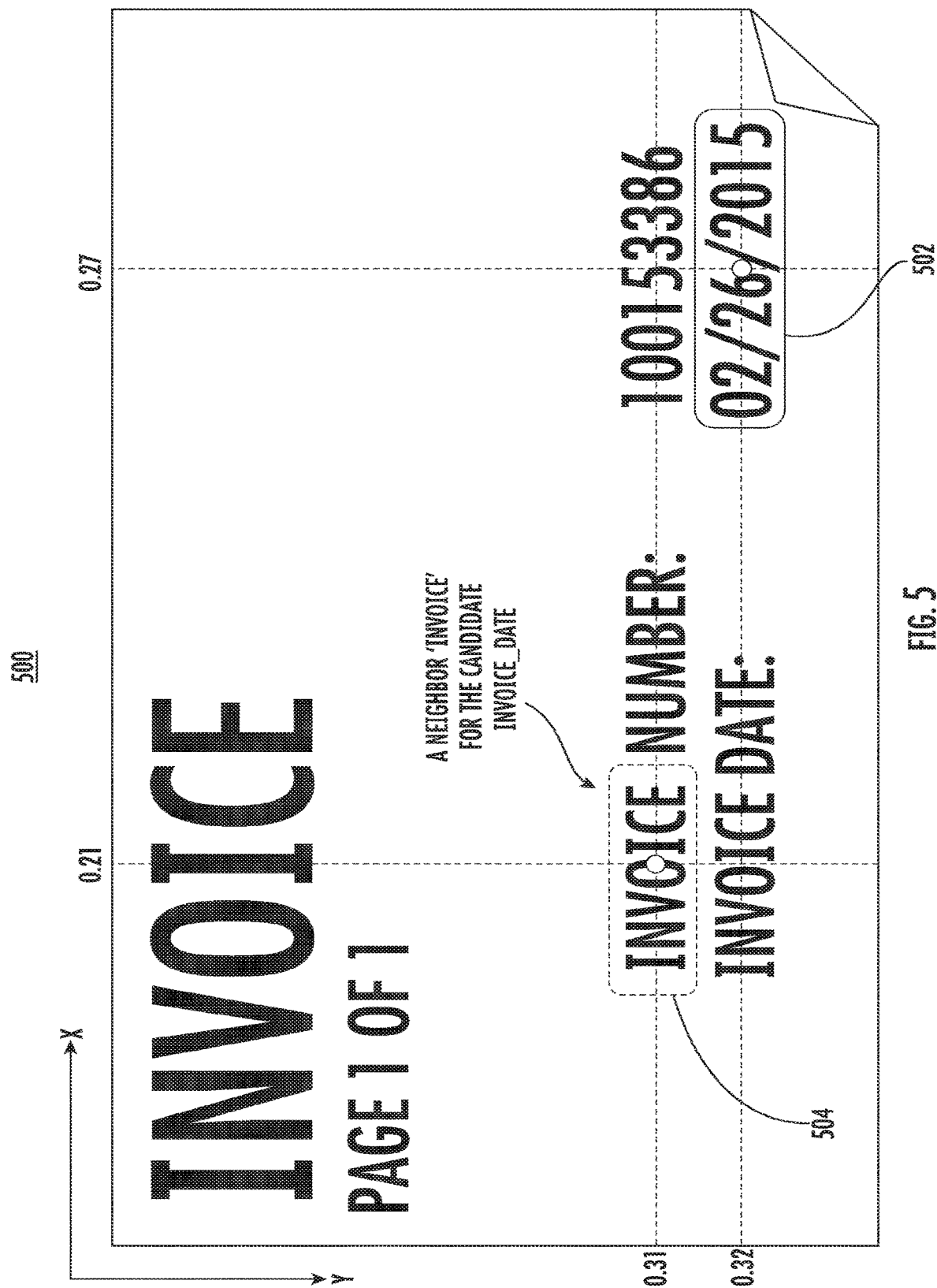
FIG. 5 depicts an example process for identifying neighbor text portions according to example aspects of the present disclosure.

FIG. 5 depicts an example process for identifying neighbor text portions within a document 500 according to example aspects of the present disclosure. In this example, a candidate text portion 502 can be identified within a document 500. The document analysis system (e.g., document analysis system 110 in FIG. 1) can identify the center position of the candidate text portion 502. Based on this center position of the candidate text portion 502, the document analysis system (e.g., document analysis system 110 in FIG. 1) can identify text portions as neighboring based on whether the text portions are to the left of the candidate text portion 502 and above the center position of the candidate text portion 502. In this example, a text portion 504 can be identified as a neighbor text portion.

Figure 6:
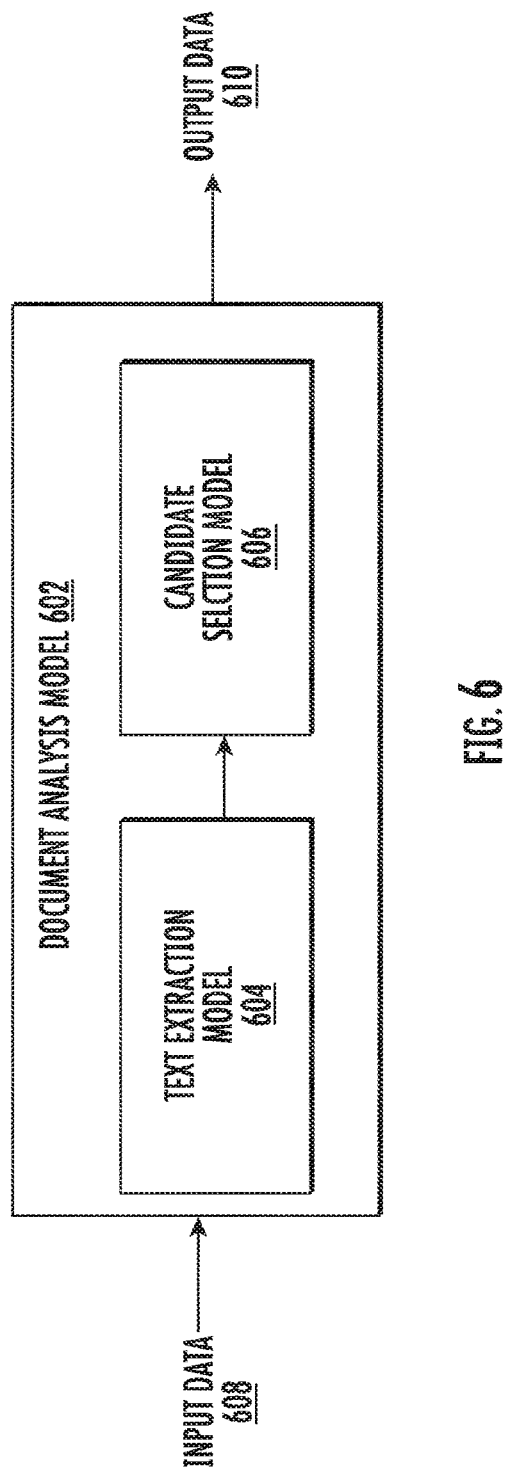
FIG. 6 depicts a block diagram of a multi-step model for document analysis according to example embodiments of the present disclosure.

FIG. 6 depicts a block diagram of a multi-step document analysis model 602 for document analysis according to example embodiments of the present disclosure. A machine-learned document analysis model 602 can include a text extraction model 604 and a candidate selection model 606. The machine-learned document analysis model 602 can be trained to receive a set of input data 608 associated with document extraction. The set of input data can include images of one or more documents and a target schema data associated with the images. In response to receiving input data 608, the model 602 provides output data 610 that describes which text portions are associated with each field in the target schema.

In some examples, the text extraction model 604 can identify and categorize one or more text portions within the document (based on OCR analysis of an image). The text extraction model 604 can also determine the content and position of each text portion within the document. In some examples, the machine-learned text extraction model 604 can otherwise include various machine-learned models such as neural networks (e.g., deep neural networks), other types of machine-learned models, including non-linear models and/or linear models, or binary classifiers. Neural networks can include feed-forward neural networks, recurrent neural networks (e.g., long short-term memory recurrent neural networks), convolutional neural networks, or other forms of neural networks.

The candidate selection model 606 can determine, for each field in a target schema, one or more candidate text portions for that field. Then, using information gathered by the text extraction model 604, the candidate selection model can generate a score for each candidate text portion. The candidate text portion with the highest score can be assigned to the particular text field. Once all the fields in a target schema have a text portion assigned to them, the candidate selection model 606 can output the assigned text portions for use and analysis. In some examples, the machine-learned candidate selection model can otherwise include various machine-learned models such as neural networks (e.g., deep neural networks), binary classifiers, or other types of machine-learned models, including non-linear models and/or linear models. Neural networks can include feed-forward neural networks, recurrent neural networks (e.g., long short-term memory recurrent neural networks), convolutional neural networks or other forms of neural networks.

Although the machine-learned text extraction model 604 and candidate selection model 606 are described as using particular techniques above, either model can be trained based on training data using various other training or learning techniques, such as, for example, backward propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over several training iterations. In some implementations, performing backward propagation of errors can include performing truncated backpropagation through time. Generalization techniques (e.g., weight decays, dropouts, etc.) can be performed to improve the generalization capability of the models being trained.

Figure 7:
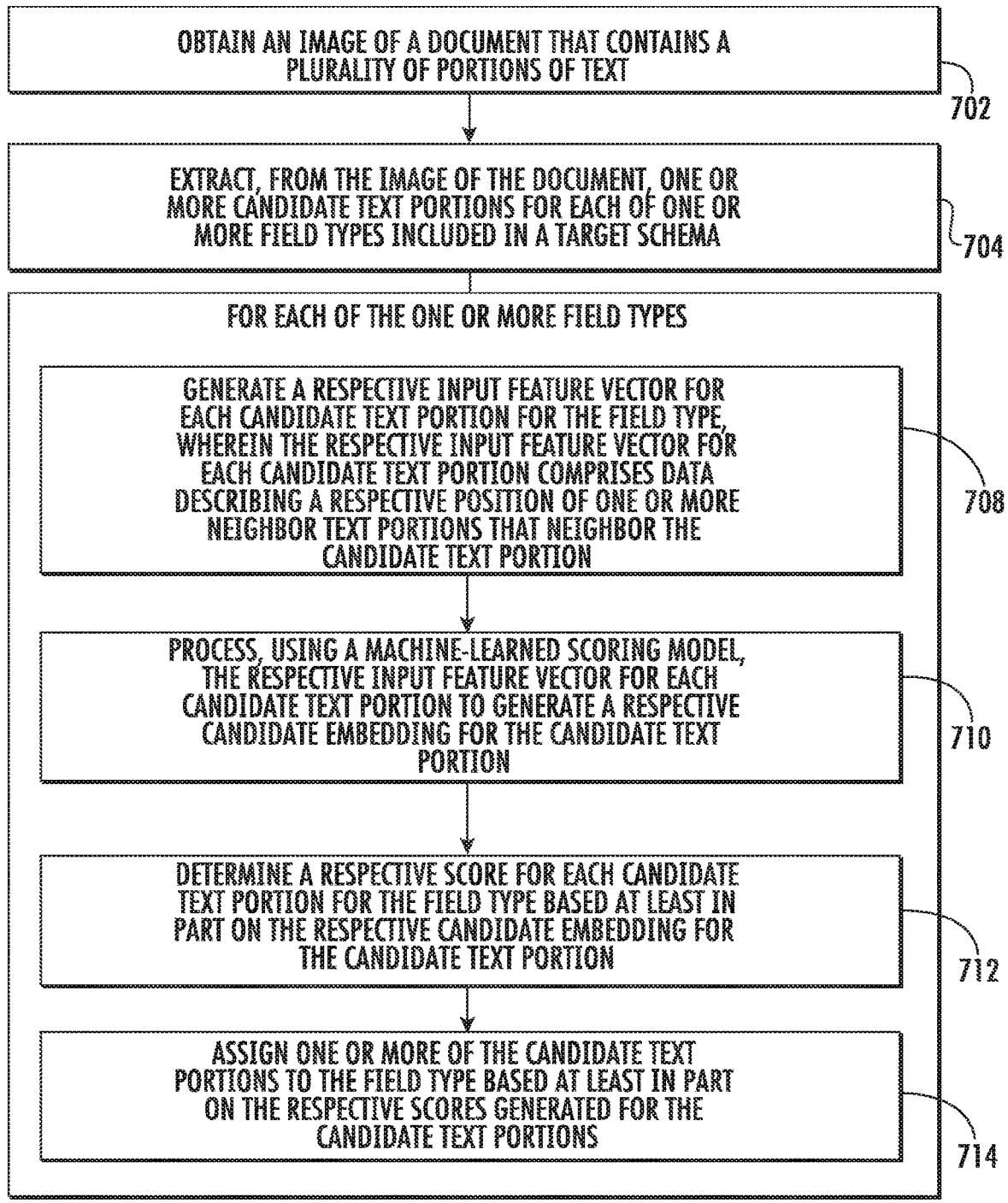
FIG. 7 depict a flowchart illustrating an example method for extracting text from a form-like document according to example embodiments of the present disclosure.

FIG. 7 depict a flowchart illustrating an example method for extracting text from a form-like document according to example embodiments of the present disclosure. One or more portion(s) of the method can be implemented by one or more computing devices such as, for example, the computing devices described herein. Moreover, one or more portion(s) of the method can be implemented as an algorithm on the hardware components of the device(s) described herein. FIG. 7 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. The method can be implemented by one or more computing devices, such as one or more of the computing devices depicted in FIGS. 1-2.

At 702, the document analysis system (e.g., document analysis system 110 in FIG. 1) can obtain, by a computing system comprising one or more computing devices, an image of a document that contains a plurality of portions of text. At 704, the document analysis system (e.g., document analysis system 110 in FIG. 1) can extract, from the image of the document, one or more candidate text portions for each of one or more field types included in a target schema.

For each of the one or more field types, the document analysis system (e.g., document analysis system 110 in FIG. 1) can, at 708, generate a respective input feature vector for each candidate text portion for the field type, wherein the respective input feature vector for each candidate text portion comprises data describing a respective position of one or more neighbor text portions that are proximate to the candidate text portion. In some examples, for the respective input feature vector for each candidate text portion, the data describing the respective position of one or more neighbor text portions that are proximate to the candidate text portion can comprise data describing a relative normalized position of the one or more neighbor text portions relative to the candidate text portion.

In some examples, the respective input feature vector for each candidate text portion can comprise data describing an absolute position of the candidate text portion. In some examples, a respective input feature vector for each candidate text portion can exclude data describing text contained in the candidate text portion.

Generating the respective input feature vector for each candidate text portion for the field type can comprise defining a respective neighborhood zone for each candidate text portion and identifying the one or more neighbor text portions for each candidate text portion based at least in part on the respective neighborhood zone for each candidate text portion and the respective positions of the one or more neighbor text portions. In some examples, the respective neighborhood zone is defined to extend from a position of the candidate text portion leftwards to a margin of the document and to extend from the position of the candidate text portion upwards a threshold amount of the document.

At 710, the document analysis system (e.g., document analysis system 110 in FIG. 1) can process, using a machine-learned scoring model, the respective input feature vector for each candidate text portion to generate a respective candidate embedding for the candidate text portion.

At 712, the document analysis system (e.g., document analysis system 110 in FIG. 1) can determine a respective score for each candidate text portion for the field type based at least in part on the respective candidate embedding for the candidate text portion. In some examples, the score can be generated by determining a respective similarity score for each candidate text portion based on a similarity metric between the respective candidate embedding for the candidate text portion and a field embedding associated with the field type. The similarity metric can comprise a cosine similarity metric.

In some examples, the machine-learned model can include one or more word embedding tables that generate respective word embeddings for each neighbor text portion. The machine-learned model can further include one or more self-attention layers that obtain the respective word embeddings for each neighbor text portion and generate an attention weight vector that down weights the respective word embeddings for each neighbor text portion that has another neighbor text portion positioned between it and the candidate text portion. In some examples, the machine-learned scoring model can be trained as a binary classifier using ground truth field type assignments for training text portions.

At 714, the document analysis system (e.g., document analysis system 110 in FIG. 1) can assign one or more of the candidate text portions to the field type based at least in part on the respective scores generated for the candidate text portions. In some examples, the candidate text portions are assigned by applying a set of one or more rules associated with a document type of the document. The document analysis system (e.g., document analysis system 110 in FIG. 1) can map the one or more of the candidate text portions assigned to one or more of the field types to an action that is presented to a user.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure cover such alterations, variations, and/or equivalents.

What is claimed is:

1. A computer-implemented method for extracting information from images of structured documents:
    obtaining, by a computing system comprising one or more computing devices, an image of a document that contains a plurality of portions of text;
    extracting, by the computing system from the image of the document, one or more candidate text portions;
    for a respective field type of one or more field types included in a target schema:
        generating, by the computing system, a respective candidate embedding for one or more candidate text portions;
        determining, by the computing system, a respective score for one or more candidate text portions for the respective field type based at least in part on the respective candidate embeddings for the candidate text portions; and
        assigning, by the computing system, one or more of the candidate text portions to the respective field type based at least in part on the respective scores generated for the candidate text portions.

2. The computer-implemented method of claim 1, wherein determining, by the computing system, the respective score for one or more candidate text portions for the respective field type based at least in part on the respective candidate embeddings for the candidate text portions comprises:
    determining, by the computing system, a respective similarity score for the one or more candidate text portions based on a similarity metric between the respective candidate embeddings for the candidate text portions and a field embedding associated with the field type.

3. The computer-implemented method of claim 2, wherein the similarity metric comprises a cosine similarity metric.

4. The computer-implemented method of claim 1, wherein generating, by the computing system using a machine-learned scoring model, a respective candidate embedding for one or more candidate text portions further comprises:
    generating, by the computing system, a respective input feature vector for the one or more candidate text portions for the field type, wherein the respective input feature vector for a respective candidate text portion comprises data describing a respective position of one or more neighbor text portions that are proximate to the respective candidate text portion.

5. The computer-implemented method of claim 4, wherein generating, by the computing system using a machine-learned scoring model, a respective candidate embedding for one or more candidate text portions further comprises:
    processing, by the computing system using a machine-learned scoring model, the respective input feature vector for a respective candidate text portion to generate a respective candidate embedding for the respective candidate text portions.

6. The computer-implemented method of claim 5, wherein, for the respective input feature vector for a respective candidate text portion, the data describing the respective position of one or more neighbor text portions that are proximate to the respective candidate text portion comprises data describing a relative normalized position of the one or more neighbor text portions relative to the respective candidate text portion.

7. The computer-implemented method of claim 4, wherein generating, by the computing system, a respective input feature vector for the one or more candidate text portions for the field type comprises:
- defining, by the computing system, a respective neighborhood zone for a respective candidate text portion; and
- identifying, by the computing system, the one or more neighbor text portions for a respective candidate text portion based at least in part on the respective neighborhood zone for the respective candidate text portion and the respective positions of the one or more neighbor text portions.

8. The computer-implemented method of claim 7, wherein defining, by the computing system, the respective neighborhood zone for a respective candidate text portion comprises, for the respective candidate text portion:
- defining, by the computing system, the respective neighborhood zone to extend from a position of the respective candidate text portion leftwards to a margin of the document and to extend from the position of the respective candidate text portion upwards a threshold amount of the document.

9. The computer-implemented method of claim 1, wherein the respective input feature vector for a respective candidate text portion comprises data describing an absolute position of the respective candidate text portion.

10. The computer-implemented method of claim 1, wherein the respective input feature vector for each candidate text portion excludes data describing text contained in the candidate text portion.

11. The computer-implemented method of claim 1, wherein the machine-learned scoring model comprises:
- one or more word embedding tables that generate respective word embeddings for each neighbor text portion; and
- one or more self-attention layers that obtain the respective word embeddings for each neighbor text portion and generate an attention weight vector that down weights the respective word embeddings for each neighbor text portion that has another neighbor text portion positioned between it and the candidate text portion.

12. The computer-implemented method of claim 1, wherein assigning, by the computing system, one or more of the candidate text portions to the field type based at least in part on the respective scores generated for the candidate text portions comprises applying, by the computing system, a set of one or more rules associated with a document type of the document.

13. The computer-implemented method of claim 1, further comprising:
- mapping, by the computing system, a respective candidate text portion assigned to a field type to an action that is presented to a user.

14. A computing system for extracting information from images of structured documents, the system comprising:
- one or more processors; and
- a non-transitory computer-readable memory that stores instructions that, when executed by the one or more processors, cause the computing system to perform operations, the operations comprising:
  - accessing an image representing a document, the document comprising a plurality of text segments;
  - determining a set of candidate text segments from the plurality of text segments for a field type included in a target schema based on semantic labels associated with the set of candidate text segments;
  - generating, using a machine-learned model, a candidate score for each respective candidate text segment in the set of candidate text segments;
  - selecting a candidate text segment from the set of candidate text segments based on the candidate scores; and
  - assigning the selected candidate text segment to the field type.

15. The computing system of claim 14, the operations further comprising:
- extracting content data and position data for one or more respective text segments in the document; and
- generating semantic labels for the one or more respective text segments based on the content data associated with the respective text segment, wherein the content data and position data of the one or more respective text segments are used to generate the candidate score for one or more of the set of candidate text segments.

16. The computing system of claim 14, wherein generating, using a machine-learned model, a candidate score for each respective candidate text segments, further comprises:
- generating, using the machine-learned model, a field embedding associated with the field type; and
- generating, using the machine-learned model, a candidate encoding associated with the respective candidate text segment, wherein the candidate score for the candidate text segment is based, at least in part, on a comparison of the field embedding and the candidate encoding.

17. The computing system of claim 16, wherein generating a candidate encoding associated with the respective candidate text segment further comprises:
- defining a respective neighborhood zone for the respective candidate text segment; and
- identifying one or more neighbor text segments for the respective candidate text segment based at least in part on the respective neighborhood zone for the respective candidate text segment and the position data of the one or more neighbor text segments.

18. The computing system of claim 17, wherein generating a candidate encoding associated with the respective candidate further comprises:
- generating a candidate position embedding based on position data associated with the respective candidate text segment; and
- generating, using the machine-learned computer model, a neighbor encoding based on the position data and content data associated with the one or more neighbor text segments for the respective candidate text segment.

19. The computing system of claim 18, wherein the machine-learned computer model comprises:
- one or more word embedding tables that generate respective word embeddings for each neighbor text segments; and
- one or more self-attention layers that obtain the respective word embeddings for each neighbor text segment and generate an attention weight vector to alter respective word embeddings for each neighbor text segment based on the position and contents of one or more other neighbor text segments.

20. A non-transitory computer-readable medium storing instruction that, when executed by one or more computing devices, cause the one or more computing devices to perform operations, the operations comprising:
   obtaining an image of a document that contains a plurality of portions of text;
   extracting, from the image of the document, one or more candidate text portions;
   for a respective field type of one or more field types included in a target schema:
      generating using a machine-learned scoring model, a respective candidate embedding for one or more candidate text portions;
      determining a respective score for one or more candidate text portions for the respective field type based at least in part on the respective candidate embeddings for the candidate text portions; and
      assigning one or more of the candidate text portions to the respective field type based at least in part on the respective scores generated for the candidate text portions.

* * * * *